2 Sheets—Sheet 1.

J. T. COOK & J. S. LEAS.

Car Coupling.

No. 9,678. Reissued April 19, 1881.

Witnesses:
W. C. McArthur
John C. Rogers

Inventors.
J. T. Cook
J. S. Leas
Per H. Alexander
Attorney.

N. PETERS, PHOTO-LITHOGRAPHER, WASHINGTON, D. C.

2 Sheets—Sheet 2.

J. T. COOK & J. S. LEAS.

Car Coupling.

No. 9,678. Reissued April 19, 1881.

Witnesses:
W. C. McArthur.
John E. Rogers

Inventors.
J. T. Cook
J. S. Leas
per W. Alexander
Attorney.

N. PETERS, PHOTO-LITHOGRAPHER, WASHINGTON, D. C.

UNITED STATES PATENT OFFICE.

JOSEPH T. COOK, OF MOLINE, AND J. SILAS LEAS, OF ROCK ISLAND, ILL.

CAR-COUPLING.

SPECIFICATION forming part of Reissued Letters Patent No. 9,678, dated April 19, 1881.

Original No. 224,881, dated February 24, 1880. Application for reissue filed December 23, 1880.

*To all whom it may concern:*

Be it known that we, JOSEPH T. COOK, of Moline, and J. SILAS LEAS, of Rock Island, in the county of Rock Island and State of Illinois, have invented certain new and useful Improvements in Car-Couplings; and we do hereby declare that the following is a full, clear, and exact description thereof, reference being had to the accompanying drawings, and to the letters of reference marked thereon, which form part of this specification, and in which—

Figure 1:
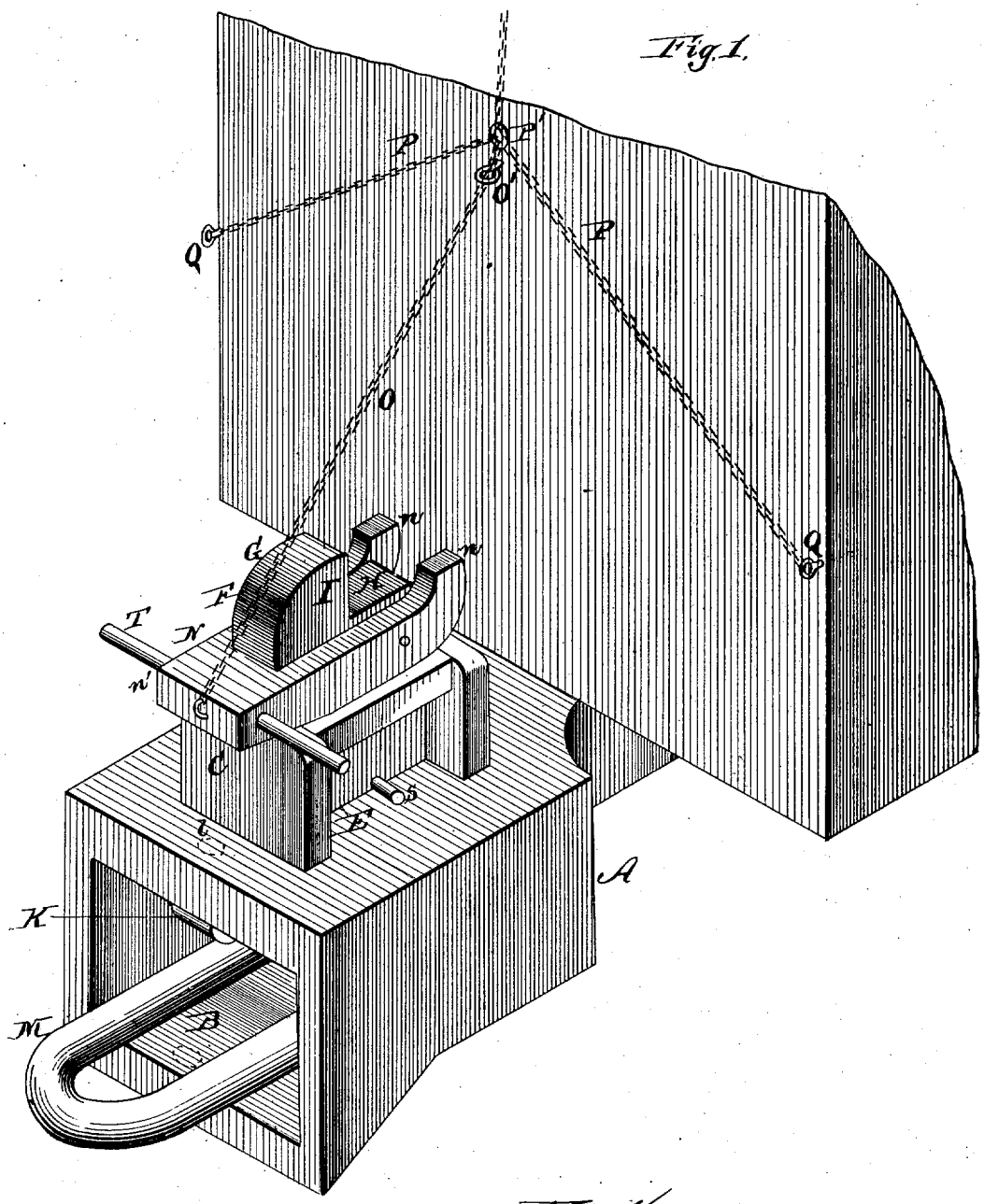
Figure 4:
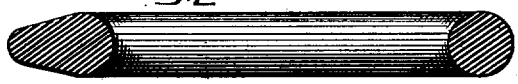
Figure 2:
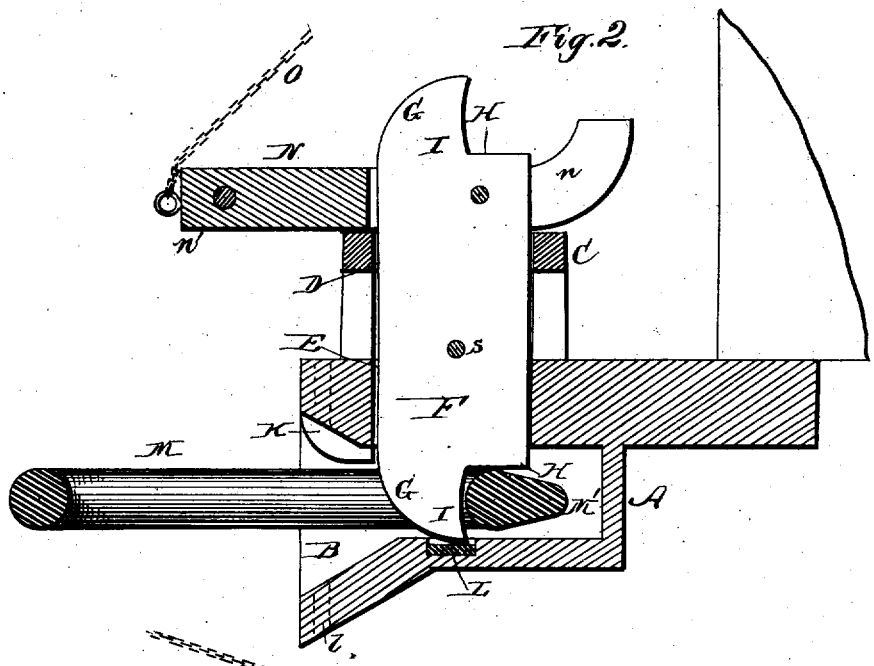
Figure 3:
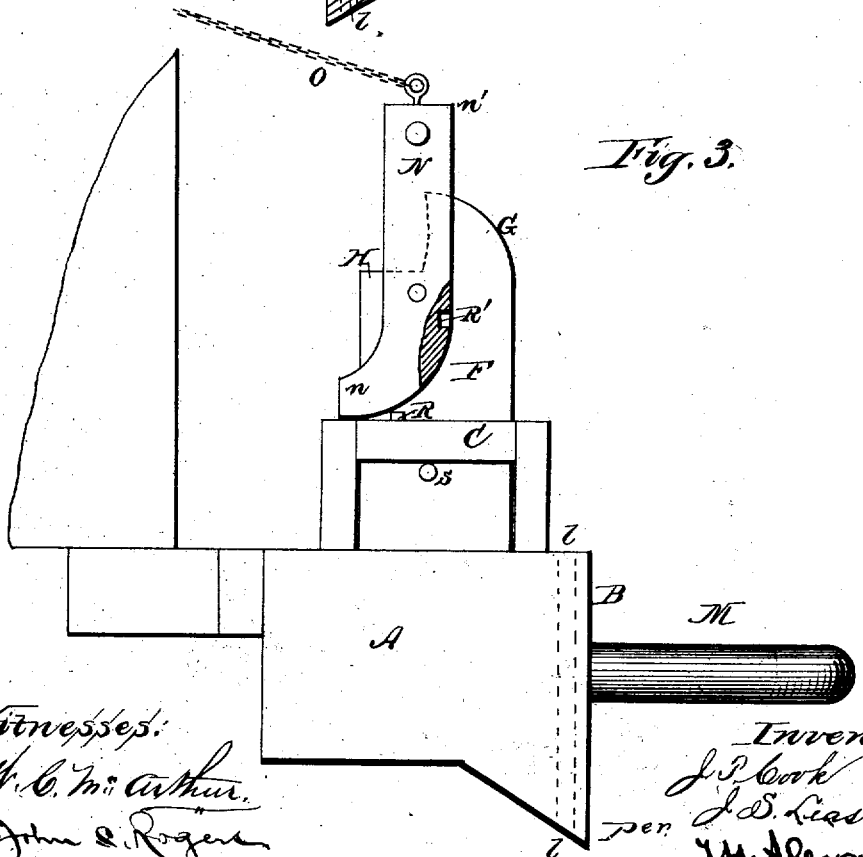

Figure 1 represents a perspective view of our car-coupler; Fig. 2, a central section; Fig. 3, a side elevation with the pin raised, and Fig. 4 a view of the link.

The nature of our improvement in car-couplers relates to the construction of the draw-head, the construction of the coupling-pin and its mode of operation, means for guiding the link into the draw-head, an elastic bed for the coupling-pin to strike against, guides for the coupling-pin, and devices for raising the coupling-pin in uncoupling, all as hereinafter fully set forth and claimed.

Referring by letter to the annexed drawings, A designates the draw-head of our improved car-coupler, the distinctive features of which consist in a flaring or bell-mouthed end, B, for the purpose of allowing a free up-and-down, or a lateral, play of the coupling-link during the rapid transit of the cars over rough roads and around curves; and also in its interior walls, formed so as to converge from its bell-mouth to its rear end, so as to accurately guide the coupling-link to a point in rear of the coupling-pin. This draw-head is provided, upon its upper side, with an extended frame or casing, C, through the top wall of which is formed an oblong rectangular mortise, D, located directly over, and corresponding in dimensions to, a similar mortise, E, which is made through the upper-wall or roof of the draw-head. The walls of these two mortises or openings in the extended frame and draw-head constitute guides for a vertically-sliding coupling-pin, F. The body of this pin corresponds in cross-section to the area of either mortise, whereby the broad flat pin which we have herein illustrated will be employed. The end of the pin F, which is designed to project down into the draw-head, either preparatory to coupling or after the coupling-link has been passed therein, is formed with a beveled front edge, G, against which the link will abut, so as to raise the pin and force its way into the draw-head; and it is also made with a notch, H, in its rear edge, so that after the end of the link has been passed to rear of the point or toe of said pin the link will be partially embraced by the walls of the notch so soon as the pin has dropped down into its normal position.

In order to obviate any possibility of the undue disengagement of the link from the pin, by reason of sudden jars or jolts of the cars, we make the vertical wall of the notch slightly curved or concaved, as indicated at I, so that, while admitting of a free lateral play of the link, it will effectually prevent its dropping down in advance of the coupling-pin, and thence being drawn out from under the same should both the coupling pin and link be suddenly raised by the motion of the cars.

It will be observed that the horizontal wall of the notch rests upon the end of the link after coupling, and by reason of the weight of the pin the link will be thereby retained in a horizontal position, ready for coupling with the draw-head of another car.

We propose making this coupling-pin reversible, in order that when one end thereof becomes worn the remaining end may be utilized for coupling, and hence we form each of said ends with a beveled and a notched portion, similar to those above described.

Upon the upper wall or roof of the expanded mouth of the draw-head we provide a beveled projection, K, which inclines downwardly from the rim of the mouth to the upper commencement of the beveled edge of the coupling-pin, whereby the link will be guided down and strike against the lower part of the nose of the pin in coupling.

Within a recess in the bottom of the draw-head we fasten a rubber bed, L, against which the point or toe of the pin will strike, and hence be prevented from becoming battered up. We also propose forming a hole, *l*, through the draw-head, in advance of this rubber bed, so that in case the regular coupling-pin should break a coupling-pin of the old style could be readily introduced through the same. (Shown in dotted lines in the annexed drawings.)

The above-described coupling-pin is designed to be raised by the link and to automatically drop by its own gravity, and to facilitate the entrance of the link between the pin and floor of the draw-head we form the link M with an extended wedge-shaped end, M′, which, it will be readily seen, will the more easily force its way between the aforesaid two members of the coupler.

The means for raising the coupling-pin when it is desired to uncouple are as follows, to wit: A yoke-shaped lever-bar, N, is pivoted to the upper end of the coupling-pin, so that its prongs *n n* embrace the broad sides thereof, and also so that when the coupling-pin has dropped down to its fullest extent the said lever will lie horizontally upon the top of the elevated frame C. The pivotal bearings of this yoke-lever are preferably nearest to the rear of the notched edge of the coupling-pin, and the ends of its prongs curve upwardly, so that when its long arm *n′* is raised the curved lower edges of its prongs will bear upon and readily slide over the top of the elevated casing.

In order to raise the lever and pin by a brakeman on top of a car, we run a chain or rope, O, from one end of the lever up through an eye, O′, on the side of the car, and thence over any suitable pulley-wheel upon the roof of the car, through any suitable guide in or on the same.

In case we desire to arrange means for effecting a like result from the sides of the car, we employ additional chains or ropes, P P, which extend from a ring, P′, in the chain O through guide-openings Q, or around pulley-wheels, and thence to the sides of the car, where they can be readily grasped by the operator, without necessitating his going between two cars. The ring P′ serves as a stop for preventing the chains from slipping down too far through the eye O′, sufficient slack being, of course, left for the free descent of the lever-bar. The leverage of this bar will necessarily be proportionate to its longer arm; and it will be seen that should, in any instance, the same be left up after uncoupling, the concussion resulting from the two draw-heads coming together would be sufficient to cause it to drop from its poised position, and hence admit of the coupling-pin dropping down into the draw-head.

In order to prevent the yoke-lever from becoming turned back too far, we secure upon the elevated casing a stop-pin, R, which, when the lever is in a horizontal position, enters a recess, R′, formed in one of its prongs. When the lever is raised, however, and thrown back, its movement will be limited by one of its prongs striking against the stop-pin.

As an additional guard against the coupling-pin being thrown out of its guide-mortises, we pass a pin, S, through its body, whereby, in cases of an extreme upward movement, such pin will strike against the top or cross bar of the elevated frame C, and hence check the coupling-pin.

Upon the long arm of the yoke-lever are handles T, which may, in some instances, be found desirable for raising it without resorting to the chains.

In order to reverse the coupling-pin, it will simply be necessary to take out the pivot and stop-pins therefrom, withdraw it from the guide-mortises in the draw-head and elevated frame, and then, after reinserting it in a reversed position, replace the stop-pin, and again pivot the yoke-lever thereto. For this last-named purpose a hole for the pivot-pin of the yoke-lever will be made near each end of the coupling-pin.

We are aware that the state of the art shows that, broadly, it is not new to construct a coupler which will admit of an automatic coupling of the cars, whether the pin is in an elevated or lowered position, and, in a generic sense, we disclaim this feature; but it will be particularly observed that the state of the art does not show a vertically-sliding coupling-pin so arranged to operate with relation to the draw-head that it will be at all times maintained in solely a vertical position and automatically couple in said position, whether it be elevated or lowered.

What we claim, therefore, and desire to secure by Letters Patent, is—

1. The combination, with a draw-head, of a vertically-sliding pin adapted, by means substantially as described, to couple with a link automatically, whether the pin be in an elevated or lowered position.

2. In a car-coupling, the combination, with a sliding pin having a front beveled edge, of a hinged lifting and setting lever, the arrangement being such that the coupling with the link will be automatic, whether the pin be in an elevated or lowered position.

3. The draw-head formed with an elastic bed for the lower end of the coupling-pin to strike against, substantially as shown and set forth.

4. The draw-head A, with mortise E, and the elevated frame C, with mortise D, in combination with the coupling-pin F and the yoke-lever N, pivoted to the coupling-pin, substantially as shown and set forth.

5. In combination with the draw-head, elevated frame, and coupling-pin, the yoke-lever N, formed with the curved prongs *n*, adapted to slide upon the top of the elevated frame when the lever is turned upon its pivot, substantially as shown and set forth.

6. The elevated frame provided with a stop-pin, R, the yoke-lever with a recess, R′, and the coupling-pin, all combined substantially as and for the purpose set forth.

7. The combination, in a car-coupling, of the elevated frame C, yoke-lever N, auxiliary handles T, and coupling-pin F, all constructed and arranged to operate substantially as herein described.

In testimony that we claim the foregoing as our own we affix our signatures in presence of two witnesses.

JOSEPH T. COOK.
J. SILAS LEAS.

Witnesses:
ELSWORTH MAPES,
IDA S. LAKE.